United States Patent
Khanna et al.

[11] Patent Number: 6,122,138
[45] Date of Patent: Sep. 19, 2000

[54] DISK DRIVE WITH VIBRATION SYNCHRONIZING RIB

[75] Inventors: Vijayeshwar Das Khanna, Ossining; Suresh Kumar, Croton-on-Hudson; Sri Muthuthamby Sri-Jayantha, Ossining, all of N.Y.

[73] Assignee: International Business Machines Corporation, Armonk, N.Y.

[21] Appl. No.: 08/970,739

[22] Filed: Nov. 14, 1997

[51] Int. Cl.[7] .................................................. G11B 33/08
[52] U.S. Cl. ...................................... 360/97.01; 360/97.02
[58] Field of Search .............................. 360/97.01, 97.02, 360/97.03, 97.04, 98.01, 105, 106

[56] References Cited

U.S. PATENT DOCUMENTS

| | | | |
|---|---|---|---|
| 4,894,735 | 1/1990 | Takahashi et al. | 360/97.01 |
| 5,414,574 | 5/1995 | Boutaghou et al. | 360/97.01 |
| 5,587,855 | 12/1996 | Kim | 360/97.02 |
| 5,596,461 | 1/1997 | Stefansky | 360/97.01 |
| 5,754,365 | 5/1998 | Beck et al. | 360/97.02 |
| 5,781,373 | 7/1998 | Larson et al. | 360/97.02 |
| 5,898,537 | 4/1999 | Oizumi et al. | 360/97.01 |

*Primary Examiner*—William R. Korzuch
*Attorney, Agent, or Firm*—Francis L. Conte

[57] ABSTRACT

A disk drive includes a data storage disk attached to a spindle which is rotatably mounted to a housing. A support shaft is also mounted to the housing parallel to the spindle, and includes an arm supported thereon parallel to the disk. A rib extends along the housing between the spindle and the support shaft for synchronizing fundamental resonant vibration thereof due to a shock load to couple in phase vibratory motion thereof. The support shaft may pivot and carry a suspension arm and data access head, or the shaft may be stationary and carry a load-unload ramp for parking the suspension arm, or both types of shafts may be used in the housing with corresponding ribs extending to the common spindle.

19 Claims, 3 Drawing Sheets

DISK DRIVE WITH VIBRATION SYNCHRONIZING RIB

BACKGROUND OF THE INVENTION

The present invention relates generally to data disk drives, and, more specifically, to shock protection thereof.

A direct access storage device (DASD) commonly referred to as a disk drive typically includes a plurality of data storage disks mounted on a common spindle which in turn is rotatably mounted to a housing. A motor rotates the spindle and disks and may be formed integrally inside the spindle itself. Data is written to and read from each of the disks by a corresponding read and write access head. The access head and disks may take any conventional form such as those commonly used for magnetically storing data in typical digitally programmable computers such as personal computers (PCs).

The access heads are in turn supported on respective suspension arms which are cantilevered from a common pivot shaft also rotatably mounted to the housing. The shaft, and in turn the suspension arms and access heads, may be pivoted or rotated in any conventional manner for positioning the access heads at any desired location over the several rotating data disks. This is typically accomplished using a conventional voice coil motor (VCM) which includes a pair of vertically spaced apart permanent magnets attached to the top and bottom of the housing and between which is positioned a coil fixedly joined to the pivot shaft opposite to the suspension arms.

In typical computer applications, such as PCs and laptop computers, available space for the disk drive is limited and therefore provides a critical limit in disk drive size and volume. Disk drives are constantly being improved to maximize the amount of data storage capability, typically expressed in gigabytes, in a minimum volume. This is accomplished in part by stacking closely together several data disks on the common spindle. In a high capacity disk drive of 3.5 inch form factor, about eight data disks may be mounted on a common spindle with a spacing between the disks of about 2.5 mm. In this extremely small space is positioned a respective suspension arm and corresponding access head for writing data to and reading data from the disks. Accordingly, during operation of the disk drive, the suspension arms are extremely close to the surface of the respective disks which are therefore subject to shock damage.

The centerline axis of the disk spindle defines a Z axis along which axis shock is a significant design parameter. In the event of an excessive Z-shock which may occur by bumping or dropping the disk drive, one or more of the access heads may physically contact the corresponding data disk causing damage to these components and the loss of data stored on the disk at the contact location. Undesirable contact between the access head and the disk may occur by the combined vibratory deflection of the suspension arm and the disk itself, with differential movement therebetween on the order of tenths of a millimeter being significant enough to effect interference contact unless suitable shock protection or isolation is provided.

Conventional shock isolators are typically in the form of elastomeric washers disposed between the housing at its mounting flanges and the chassis of the computer. However, in view of the critical space limitations within modern computers, it is desired to eliminate the traditional isolators, which correspondingly increases the likelihood of excessive differential motion between the access heads and the disk during Z-shock. To recover this loss of shock resistance, the spacing between the disks may be increased, yet this, however, correspondingly decreases the volumetric density of the disk drive and its ability to store a large volume of data.

Accordingly, it is desired to provide a disk drive having improved shock resistance without the need for conventional external isolators and without diminishing the maximum data storage capability of the disk drive in specific form factor, such as 3.5 inches for example.

SUMMARY OF THE INVENTION

A disk drive includes a data storage disk attached to a spindle which is rotatably mounted to a housing. A support shaft is also mounted to the housing parallel to the spindle, and includes an arm supported thereon parallel to the disk. A rib extends along the housing between the spindle and the support shaft for synchronizing fundamental resonant vibration thereof due to a shock load to couple in phase vibratory motion thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
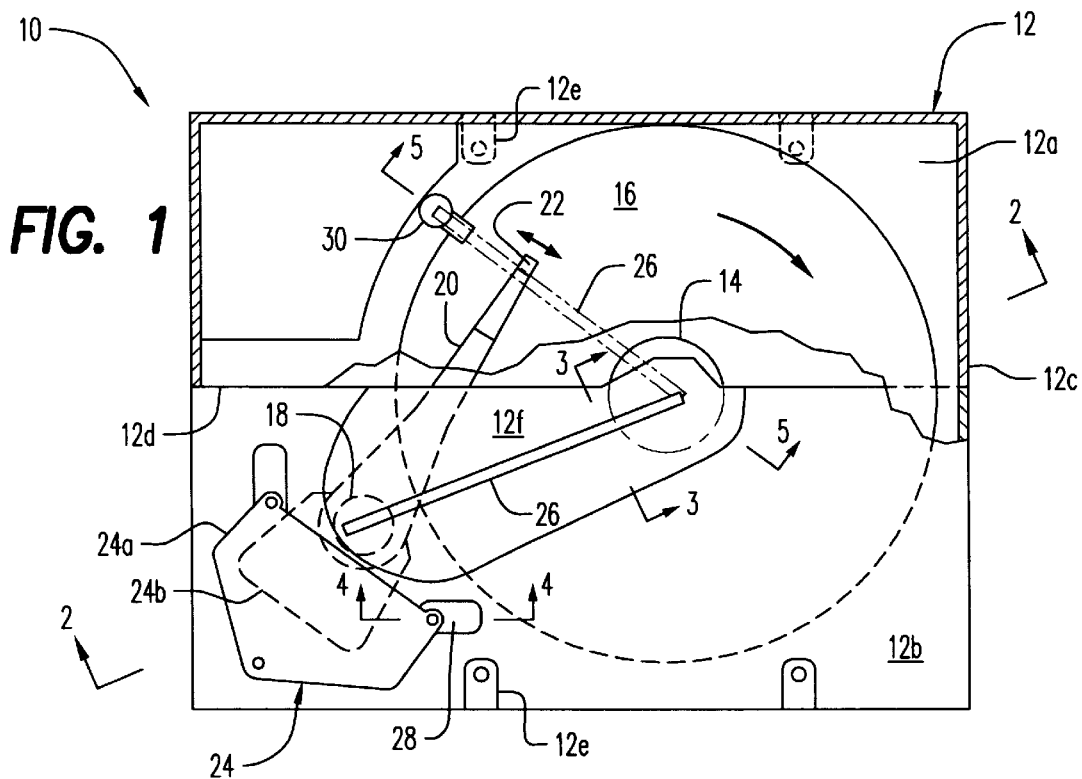
FIG. 1 is a top, partly sectional view of an exemplary disk drive including a plurality of data storage disks mounted to a spindle in a housing in accordance with an exemplary embodiment of the present invention.

Illustrated schematically in FIG. 1 is an exemplary direct access storage device (DASD) in the form of a data storage disk drive 10. The disk drive 10 may take any conventional form and form factor, such as a 3.5 inch form factor, which limits the available volume for data storage therein.

The disk drive 10 includes a housing 12 which may have any suitable configuration and is typically formed of relatively thin metal for reducing weight and providing sufficient structural integrity for supporting the internal components of the drive 10. In the exemplary embodiment of the disk drive 10 illustrated in FIGS. 1 and 2, the housing 12 includes a bottom plate 12a, a top plate 12b spaced upwardly therefrom, and integral sidewalls 12c therearound. In the exemplary embodiment illustrated, the housing 12 is formed in two halves joined together at a vertical splitline 12d. This configuration is conventional and allows the internal components of the drive 10 to be assembled and mounted into one of the halves, with the other housing half then being assembled to complete the enclosure. The housing 12 also includes suitable mounting flanges 12e which may be integrally formed on either the bottom or top plates 12a,b for mounting the drive to a chassis (not shown) in a conventional computer such as a personal computer (PC) or laptop computer.

In accordance with the present invention, the disk drive 10 may be mounted to the computer without the use of traditional vibration isolators which would be found at each of the mounting flanges 12e. Since a suitable amount of shock protection or resistance is required in the disk drive 10 to prevent internal shock damage thereto, the loss of shock resistance due to the missing isolators is recovered due to certain improvements in the disk drive 10 in accordance with the present invention without a decrease in data storage capability in the limited available volume of the specific form factor, 3.5 inch for example.

More specifically, the disk drive 10 further includes a spindle 14 rotatably mounted to the housing 12 at either or both of its opposite ends in a conventional manner using suitable roller bearings for example. The spindle 14 is suitably rotated during operation about its longitudinal or centerline Z axis which is typically oriented vertically in normal use. This is typically accomplished using an internal motor inside the spindle 14.

The spindle 14 includes a plurality of data storage platters or disks 16 fixedly joined thereto for rotation therewith. The configuration and number of the disk 16 are conventional for maximizing the data storage capability of the disk drive 10 in the specific limiting form factor of the disk drive 10. For example, the disks 16 may be configured for magnetically storing data thereon, and there maybe about eight disks stacked on the spindle 14 with suitable vertical spacing therebetween on the order of about 2.5 mm for example.

A support shaft in a first form of a pivot shaft 18 is rotatably mounted to the housing 12 adjacent the perimeter of the disks 16 and vertically parallel to the spindle 14. The pivot shaft 18 may be mounted at its lower or upper end, or both, to the respective bottom and top plates 12a,b of the housing using suitable roller bearings in a conventional manner.

Figure 2:
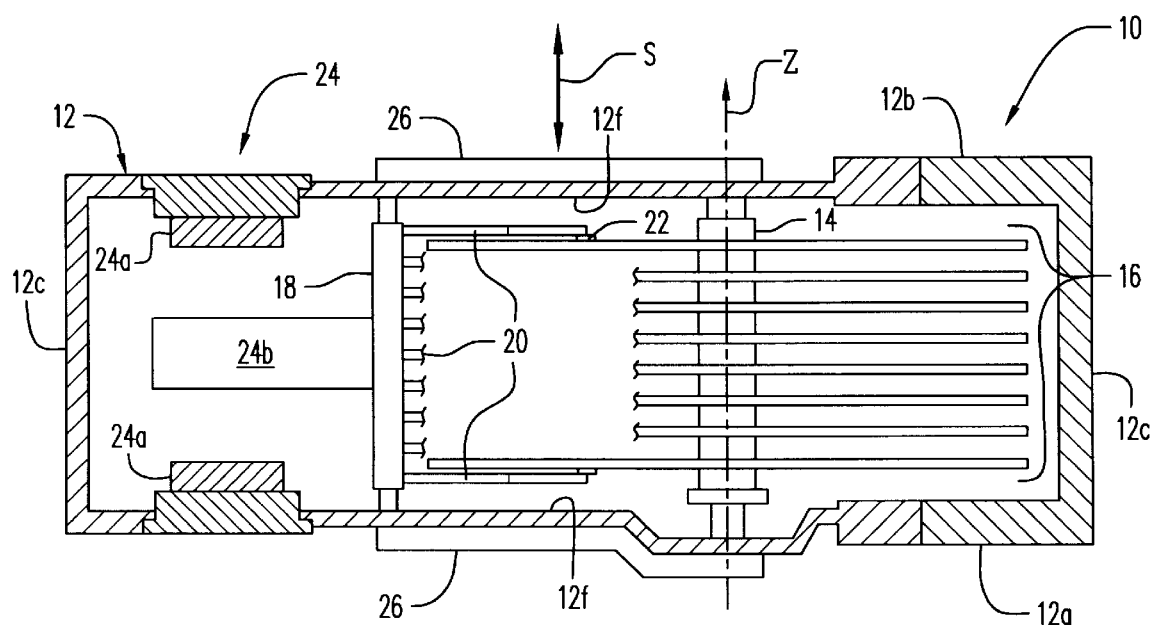
FIG. 2 is a partly sectional, elevational view through the disk drive illustrated in FIG. 1 and taken along line 2—2 showing cooperating access heads suspended from a common support shaft mounted to the housing.

As shown in FIG. 2, the pivot shaft 18 includes a plurality of vertically spaced apart support or suspension arms 20 fixedly attached thereto and supported thereon generally parallel to the respective disks 16 in a cantilever manner. Suspended or attached to respective distal ends of the suspension arms 20 are respective read and write access heads 22 configured for writing data to the disks 16 and reading data therefrom, magnetically in the exemplary embodiment.

The disk drive 10 further includes a voice coil motor (VCM) 24 as shown in FIGS. 1 and 2 which includes a pair of vertically spaced apart permanent magnets 24a suitably mounted through corresponding apertures in the bottom and top plates 12a,b of the housing 12. A voice coil 24b is fixedly attached to the pivot shaft 18 diametrically opposite to the suspension arms 20, and is positioned vertically between the magnets 24a and suitably energized for selectively pivoting or rotating the pivot shaft 18 and suspension arms 20 to position the access heads 22 over the respective disks 16 to write data thereto or read data therefrom.

The disk drive 10 described above is conventional in configuration and operation for reading and writing data magnetically. During operation, the disks 16 rotate with the spindle 14, and a thin air cushion suspends the individual access heads 22 above or below the respective disks 16. The inboard disks 16 are accessed by access heads 22 suspended vertically in the small space therebetween, on the order of about 2.5 mm for example. In the event of a vertical shock load S along the Z-axis as shown in FIG. 2 caused by bumping or dropping the disk drive 10, inertia forces will cause vibratory response of the individual components of the disk drive 10. Any mass is subject to vibration when mounted on a member having a spring constant. And, any such mass has a fundamental or primary resonant mode of vibration at a corresponding resonant frequency. Higher modes or orders of vibration are also possible but typically require higher levels of corresponding excitation energy.

In a typical disk drive, the individual components such as the spindle 14 and pivot shaft 18 are mounted to the housing 12 which is made as thin as possible for maximizing available space for the data disk 16. The conventional housing may vary in thickness as warranted for providing suitable structural integrity of the housing for mounting the various internal components therein and providing a sufficiently rigid enclosure.

However, it has been discovered by analysis and testing that a typical Z-shock load S will excite conventional spindles and pivot shafts at different fundamental resonant frequencies. For example, the disks attached to the spindle have a fundamental umbrella vibration mode wherein the vibratory displacement continuously increases in magnitude from the spindle to the disk perimeter. The access heads attached to the suspension arms and pivot shaft have a fundamental cantilever vibration mode where the vibratory displacement continuously increases from the pivot shaft to the access head. And, the cantilever mode is at a higher frequency than the umbrella mode, with correspondingly different displacement phases.

Accordingly, the out-of-phase resonant vibration between the access heads and respective data disks may lead to premature contact or impact therebetween under Z-shock. For a shock S on the order of about 100 G (gravity) over 2 milliseconds, relative motion between the access heads and the disks in a 3.5 inch form factor disk drive is about a millimeter.

In accordance with the present invention, it has been discovered that increased shock resistance of the disk drive 10 may be effected by specifically synchronizing fundamental resonant vibration of the spindle 14 and pivot shaft 18 due to the Z-shock load S to couple in phase vibratory motion thereof in a common fundamental mode of vibration.

By synchronizing the vibratory response of the pivot shaft 18, and in turn the suspension arms 20 and access heads 22, with the vibratory response of the spindle 14, and in turn the disks 16, the access heads 22 are caused to vibrate in-phase with the respective disks 16 to prevent or reduce the likelihood of premature impact or contact therebetween which may damage the disks and result in data loss. For a given shock magnitude, increased shock resistance is effected. Alternatively, higher magnitude of Z-shock S may be accommodated prior to head-disk impact.

In accordance with the present invention, synchronizing vibratory response of the access heads 22 and the disks 16 may be accomplished by rigidly mechanically coupling together the spindle 14 and the pivot shaft 18 along the housing 12 therebetween to provide a collective assembly with a common fundamental natural frequency and resonant mode of vibration, instead of two different fundamental resonant frequencies and modes of vibration in a conventional unsynchronized disk drive.

Spindle-shaft coupling is effected in accordance with an exemplary embodiment of the present invention illustrated in FIGS. 1 and 2 by using means in the form of a rigid link or rib 26 preferably joined integrally to the housing 12 and extending transversely along the housing 12 between the spindle 14 and the pivot shaft 18 at their bearing mounts. The rib 26 is sufficiently rigid for synchronizing the fundamental resonant vibration of the so-coupled spindle 14 and pivot shaft 18 due to the Z-shock load S. In this way, the spindle 14, with attached disks 16, is coupled to the pivot shaft 18 and attached access heads 22, to couple in phase fundamental vibratory motion thereof at a common fundamental frequency.

Furthermore, it is also desirable to flexibly weaken or uncouple vibratory motion of the coupled spindle 14 and pivot shaft 18 from the housing 12 laterally around the rigid coupling effected by the rib 16. For example, the rib 26 preferably terminates at opposite ends thereof adjacent the spindle 14 and pivot shaft 18 to decouple or uncouple the coupled spindle 14 and pivot shaft 18 from the remaining portions of the housing 12. In the exemplary embodiment illustrated in FIG. 2, the spindle 14 and pivot shaft 18 are mounted in suitable bearings to both the bottom and top plates 12a,b. Accordingly, respective ones of the ribs 26 are provided along the outer surface of the bottom plate 12a and the outer surface of the top plate 12b and effectively bridge together the spindle 14 and pivot shaft 18 at their mounting bearings to provide a collectively rigid assembly which vibrates with a common fundamental resonant frequency.

As initially shown in FIGS. 1 and 2, the housing 12 includes a common base 12f in each of the bottom and top plates 12a,b, which extends between the spindle 14 and the pivot shaft 18. The respective ribs 26 are preferably integrally formed with the respective bases 12f in a generally T-shaped cross section. For example, the ribs 26 may be conventionally cast into the respective portions of the housing 12.

Figure 3:
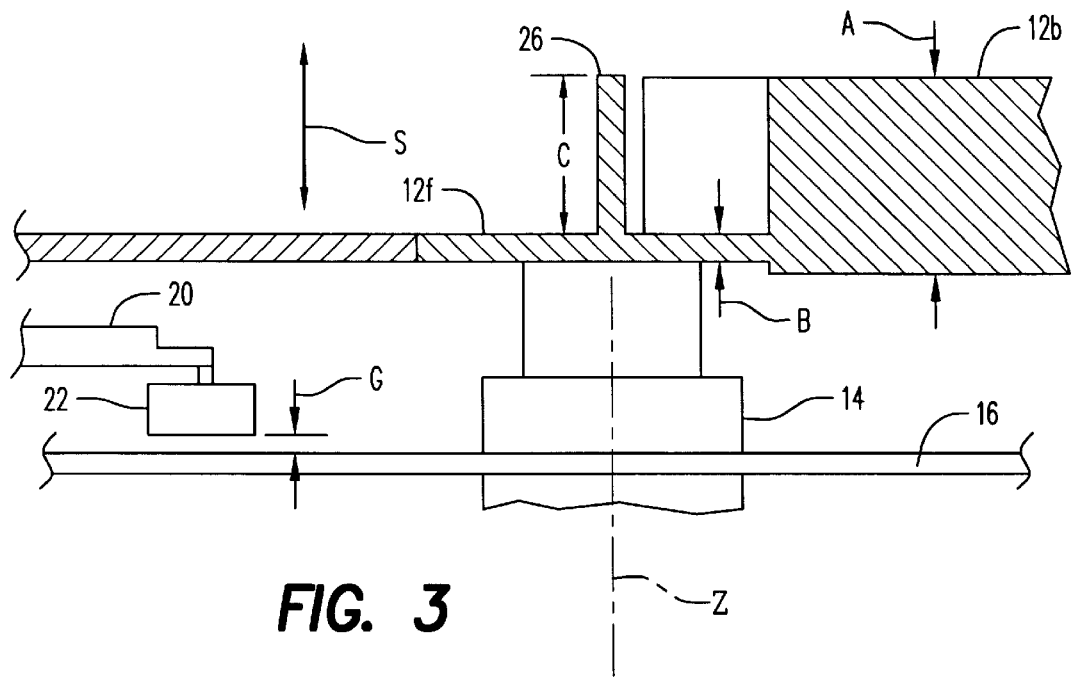
FIG. 3 is a partly sectional, elevational view of a portion of the housing and spindle illustrated in FIG. 1 and taken along line 3—3.

The top rib 26 is illustrated in more detail in FIG. 3 integrally joined to the housing base 12f portion of the top plate 12b. The rib 26 is specifically configured and sized to have a greater bending moment of inertia than the relatively thinner base 12f in the vicinity laterally around the rib 26 as illustrated in more particularity in FIG. 1. As shown in FIG. 3, the housing top plate 12b has a nominal thickness A in its portions away from the rib 26 and decreases in thickness B at the local base 12f surrounding the rib 26, with the base thickness B being less than the nominal housing or plate thickness A. In this way, the housing is selectively weakened or made more flexible in the local region surrounding each of the ribs 26 to decouple the spindle 14 and pivot shaft 18 from the remainder of the housing 12. The rib 26 has a suitable height C which is greater than the thickness B of the housing base 12f for providing greater bending moment of inertia. The rib 26 may take any suitable form for providing suitable rigid coupling between the spindle 14 and the pivot shaft 18.

The combination of the rigid structural coupling between the spindle 14 and pivot shaft 18 along the housing 12 on which these components are mounted, along with the uncoupling of the housing base 12f from the remaining portions of the housing allow the spindle 14 and pivot shaft 18 to vibrate in unison in the fundamental vibration mode due to the shock S. Analysis and test results indicate that the fundamental, umbrella mode of vibration of the disks 16 effects vibratory response thereof several times larger than the cantilever vibratory response of the support arm and access head. By vibrating in phase the access heads 22 with the disks 16, an increased margin of separation therebetween is effected which provides enhanced shock resistance in the disk drive 10. These results also indicate that the suspension arms 20 and attached heads 22 also vibrate with an additional higher order, or second, mode of vibration, with the amplitude thereof being relatively small, and being superimposed atop the fundamental, or first, mode thereof while maintaining vibratory separation from the in-phase disks 16.

As shown in FIGS. 1 and 2, the voice coil motor 24 controls the pivot position of the shaft 18 and the corresponding positions of the access heads 22 atop the disks 16. Since the permanent magnets 24a are relatively heavy components mounted to the relatively thin housing 12, they can ordinarily significantly affect the vibratory response of the pivot shaft 18 adjacent thereto. Accordingly, and as shown in FIG. 2, the ribs 26 preferably also terminate at a suitable spacing from the respective magnets 24a to uncouple therefrom vibratory motion of the couple-together pivot shaft 18 and spindle 14. By providing a suitably flexible separation between the permanent magnets 24 and the pivot shaft 18, the magnets 24a are flexibly uncoupled therefrom along the housing 12 to improve the isolated coupled response of the spindle 14 and pivot shaft 18 at a common fundamental resonant frequency.

Figure 4:
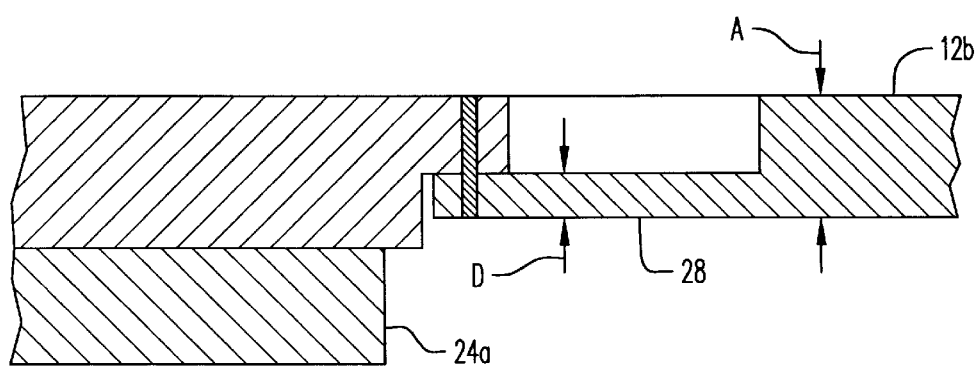
FIG. 4 is a sectional elevational view of a portion of the housing illustrated in FIG. 1 and taken along line 4—4 in which is mounted a permanent magnet of a voice coil motor.

As shown in FIG. 1, each of the magnets 24a is suitably mounted to the housing 12 adjacent to the thin base 12f at a plurality of spaced apart mounting tabs 28 shown in more particularity in FIG. 4. The mounting tabs 28 are integral portions of the housing 12 and may be defined by corresponding recesses or notches in the housing 12 giving the tabs 28 a thickness D suitably thinner than the nominal thickness A of the housing plates themselves. The mounting tabs 28 are therefore thinner than the adjacent portions of the housing and therefore have a smaller bending moment of inertia to uncouple vibratory motion of the magnets 24a due to the shock load S from the coupled-together pivot shaft 18 and spindle 14.

As shown in FIG. 1, the two mounting tabs 28 adjacent the pivot shaft 18 are preferably spaced from the thinner base 12f, and the housing 12 is thicker therebetween. As indicated above, the housing 12 requires a nominal thickness for providing structural integrity thereof, and is selectively thinned in accordance with the present invention for uncoupling the various components of the disk drive 10 from the pivot shaft 18 and spindle 14 which are intentionally coupled together for common vibratory response.

As indicated above, and referring to FIG. 2, one rib 26 and thinner base 12f are located in at least one of the bottom and top plates 12a,b of the housing 12, and in the exemplary embodiment illustrated are mounted in both plates. In an alternate embodiment (not shown) the pivot shaft 18 and spindle 14 may be mounted solely at one end from one support plate in the housing such as the bottom plate 12a, with the other end thereof being free. In such an embodiment, only the supported or attached ends of the spindle 14 and shaft 18 require the coupling rib 26 therebetween.

In the exemplary embodiment of the disk drive 10 illustrated in FIG. 1, a parking shaft 30 is fixedly mounted at opposite ends thereof to the housing 12 in a conventional manner for providing a load and unload (L/UL) zone. As shown in more detail in FIG. 5, the parking shaft 30 is mounted near the perimeter of the disk 16 parallel to the spindle 14, and includes a plurality of vertically spaced apart support arms defining parking ramps 32 extending outwardly therefrom and in part parallel over respective ones of the disk 16. The parking shaft 30 is conventionally provided for receiving respective ones of the suspension arms 20 and supported access heads 22 when the disk drive is in a standby or non-operating mode of operation.

Figure 5:
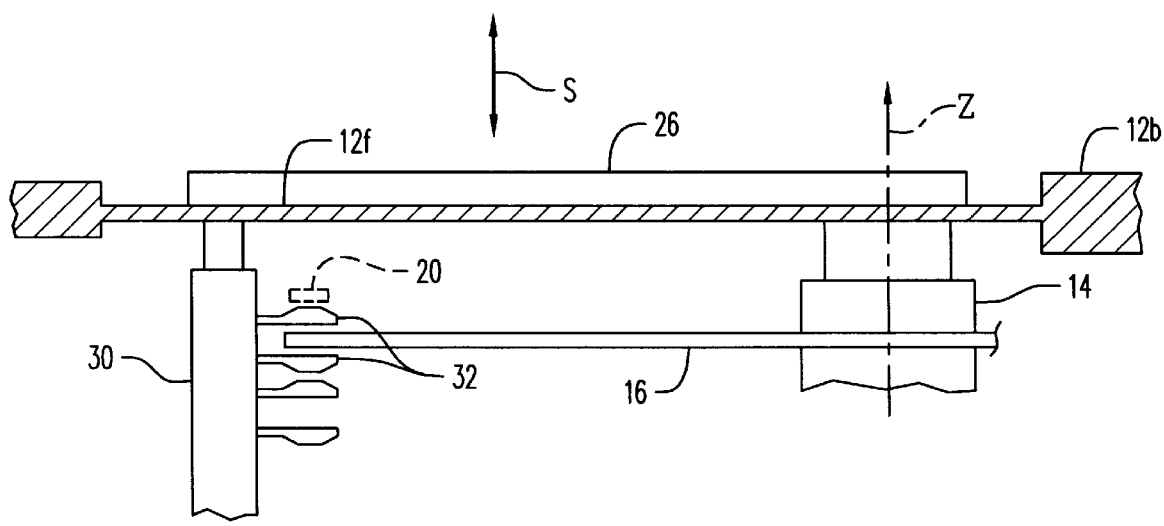
FIG. 5 is an elevational, sectional view through the disk drive illustrated in FIG. 1 and taken along line 5—5, and illustrates a cooperating parking shaft and ramps attached to the housing in accordance with another embodiment of the present invention.

Since the parking ramps 32 extend in part over the respective disks 16, they too are subject to Z-shock load impact with the disks 16 which may cause damage to the perimeters thereof. Accordingly, an additional one of the ribs 26 as shown in FIG. 5 may be used to couple in phase the vibratory shock motion of the parking ramps 32 and the disks 16 under the shock load S. The parking shaft 30 is directly analogous to the pivot shaft 18 since they are both mounted to respective portions of the housing 12 and include respective suspension arms 20 and parking ramps 32 which are spaced closely adjacent to respective ones of the disk 16. The parking shaft 30 may be similarly rigidly coupled to the spindle 14 to synchronize the fundamental vibratory response therewith in the same manner as the pivot shaft 18.

As shown in FIG. 5, the additional rib 26 is suitably configured and sized to bridge the spindle 14 and the parking shaft 30 along the housing 12, and along both the bottom and top plates 12a,b in the exemplary embodiment. The housing 12 also includes an additional local thinned base 12f integrally formed with the rib 26 for uncoupling the remainder of the housing from the coupled together spindle 14 and parking shaft 30. In this way, both the pivot shaft 18 and parking shaft 30 are coupled to the spindle 14 to couple in-phase fundamental vibratory motion of the access heads 22 and parking ramp 32 with the corresponding disks 16 under the shock load S.

Accordingly, by specifically tailoring thickness of the housing 12 and providing the integral rigid ribs 26 therein, vibratory motion of the spindle 14 and attached disks 16 may be coupled with any potentially contacting components such as the access heads 22 suspended from the pivot shaft 18 or the parking ramps 32 suspended from the parking shaft 30, or both. Synchronizing fundamental vibratory response of the spindle 14, access heads 22, and parking ramps 32 thereby increases the effective separation distance between these components during the shock load for providing enhanced shock resistance in the disk drive 12. Conventional shock isolators may then be eliminated in mounting the disk drive 10. And, maximum density of the disk drive 16 within the limiting envelope of the housing 12 for a specific form factor may be maintained. Maximum data storage capacity in a given volume is therefore provided with enhanced shock resistance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A disk drive for storing data comprising:
   a housing;
   a spindle rotatably mounted to said housing, and including a data storage disk fixedly joined thereto;
   a support shaft mounted to said housing parallel to said spindle, and including a support arm supported thereon parallel to said disk for supporting an access head to access data on said disk; and
   a rib extending along said housing, and fixedly joined thereto between said spindle and said support shaft for collectively synchronizing fundamental resonant vibration thereof due to shock load to couple in phase vibratory motion of said disk and said arm.

2. A disk drive according to claim 1 wherein said rib terminates at opposite ends adjacent said spindle and said support shaft to uncouple said coupled spindle and support shaft from said housing.

3. A disk drive according to claim 2 wherein:
   said housing includes a base extending between said spindle and said support shaft; and
   said rib is integrally formed with said base.

4. A disk drive according to claim 3 wherein said rib has a greater bending moment of inertia than said base laterally around said rib.

5. A disk drive according to claim 4 wherein said support shaft is in the form of a pivot shaft rotatably mounted to said housing adjacent said disk, and said support arm is in the form of a suspension arm fixedly attached to said pivot shaft, with said access head being suspended from a distal end of said suspension arm for writing data to and reading data from said disk; and said rib couples in phase said access head with said disk under said shock load.

6. A disk drive according to claim 5 further comprising a voice coil motor including a permanent magnet mounted to said housing, and a coil fixedly mounted to said pivot shaft adjacent said magnet for selectively pivoting said pivot shaft and said suspension arm to position said access head over said disk; and
   said rib is spaced from said magnet to uncouple therefrom vibratory motion of said coupled pivot shaft and spindle.

7. A disk drive according to claim 6 wherein said magnet is mounted to said housing adjacent said base at a plurality of spaced apart mounting tabs, and said mounting tabs are thinner than said housing to uncouple vibratory motion of said magnet due to said shock load from said coupled pivot shaft and spindle.

8. A disk drive according to claim 7 wherein said mounting tabs are spaced from said base, and said housing is thicker therebetween.

9. A disk drive according to claim 6 wherein:
   said housing includes a bottom plate, a top plate spaced therefrom, and sidewalls therearound; and
   said rib and said base are located in said bottom plate, with said pivot shaft and said spindle being mounted thereto.

10. A disk drive according to claim 9 further comprising additional ones of said rib and said base located in said top plate, with said pivot shaft and said spindle being mounted at opposite ends to both said bottom and top plates.

11. A disk drive according to claim 4 wherein said support shaft is in the form of a parking shaft fixedly mounted to said housing, and said support arm defines a parking ramp extending outwardly therefrom and over said disk for receiving a pivoted suspension arm supporting an access head to write data to and read data from said disk; and
   said rib couples in phase said parking ramp with said disk under said shock load.

12. A disk drive according to claim 4 wherein:
   said support shaft is configured in a first form comprising a pivot shaft rotatably mounted to said housing adjacent said disk, and said support arm defines a suspension arm fixedly attached to said pivot shaft, with said access head suspended from a distal end of said arm for writing data to and reading data from said disk;

an additional support shaft is configured in a second form comprising a parking shaft fixedly mounted to said housing, and an additional support arm defines a parking ramp extending outwardly therefrom and over said disk for receiving said suspension arm supporting said access head; and an additional rib and base extend between said spindle and said parking shaft to couple in phase said access head and parking ramp with said disk under said shock load.

13. A method for effecting shock resistance in a disk drive having a spindle mounted data disk and a shaft mounted support arm joined to a housing, comprising rigidly coupling said spindle and said shaft with a rib along said housing for collectively synchronizing fundamental resonant vibration of said spindle and shaft due to shock load to couple in phase vibratory motion of said disk and said arm.

14. A method according to claim 13 wherein said synchronizing is further effected by flexibly uncoupling said spindle and shaft from said housing around said rigid coupling.

15. A method according to claim 14 wherein said support arm suspends an access head over said disk to write data thereto and read data therefrom.

16. A method according to claim 15 wherein:

said support shaft further includes a coil cooperating with a permanent magnet attached to said housing for pivoting said shaft and support arm to position said access head over said disk; and said magnet is flexibly uncoupled from said support shaft and spindle along said housing.

17. A method according to claim 14 wherein said shaft suspends a parking ramp over said disk for receiving a pivoted suspension arm and access head for writing data to and reading data from said disk.

18. A disk drive comprising:

a housing;

a data storage disk rotatably mounted to said housing by a spindle;

a shaft mounted to said housing parallel to said spindle, and including an arm supported thereon parallel to said disk; and means including a rib fixedly joined to said housing between said spindle and said shaft for collectively synchronizing fundamental resonant vibration of said disk and said arm due to shock load.

19. A disk drive according to claim 18 wherein said synchronizing means are effective for:

coupling in phase vibratory motion of said disk and said arm; and uncoupling said coupled disk and said arm from said housing.

* * * * *